(12) United States Patent
Arlitt

(10) Patent No.: US 12,067,030 B2
(45) Date of Patent: Aug. 20, 2024

(54) COMPUTER-IMPLEMENTED PROGRESS MODELING OF MULTI-EVENT PROCESS

(71) Applicant: Travis James Arlitt, Houston, TX (US)

(72) Inventor: Travis James Arlitt, Houston, TX (US)

( * ) Notice: Subject to any disclaimer, the term of this patent is extended or adjusted under 35 U.S.C. 154(b) by 0 days.

(21) Appl. No.: 17/991,432

(22) Filed: Nov. 21, 2022

(65) Prior Publication Data
US 2023/0161790 A1     May 25, 2023

Related U.S. Application Data

(60) Provisional application No. 63/281,484, filed on Nov. 19, 2021.

(51) Int. Cl.
*G06F 16/26*        (2019.01)
*G06F 16/22*        (2019.01)
*G06F 16/2457*    (2019.01)

(52) U.S. Cl.
CPC .......... *G06F 16/26* (2019.01); *G06F 16/2228* (2019.01); *G06F 16/2457* (2019.01)

(58) Field of Classification Search
CPC .. G06F 16/2228; G06F 16/2457; G06F 16/26; G06F 16/285; G06F 16/9535; G06F 16/25
USPC ............................................. 707/722
See application file for complete search history.

(56) References Cited

U.S. PATENT DOCUMENTS

2021/0090694 A1*   3/2021   Colley ................... G16H 15/00
2022/0269957 A1*   8/2022   Rangan ................ G06F 16/285

\* cited by examiner

*Primary Examiner* — Hung T Vy
(74) *Attorney, Agent, or Firm* — Caldwell Intellectual Property Law

(57) ABSTRACT

Subject matter disclosed herein may relate to systems, devices and/or processes for computer implemented modeling of a multi-event process. In an embodiment, the method may include loading into one or more computer memory devices, a digitized representation of events of the multi-event process, in which a first one or more of the plurality of events is linked to a previous first one or more or of a second one or more of the plurality of events and generating a first visual representation of one or more visual indicators to represent progress of the first one or more of the plurality of events. The method may additionally include computing a respread progress profile of the first one or more events based, at least in part, on one or more modified attributes of the first one or more or of the second one or more of the plurality of events.

16 Claims, 10 Drawing Sheets

COMPUTER-IMPLEMENTED PROGRESS MODELING OF MULTI-EVENT PROCESS

BACKGROUND

Field

Subject matter disclosed herein may relate to computer-implemented systems, devices, and/or computing platforms to bring about the modeling of a multi-event process, such as in relation to a multi-event or multi-phase effort, which may involve time-phased processes, subprocesses, and/or events.

Information

In a multi-event process, which may involve various time-phased processes, subprocesses, and/or events, a contractor, for example, may submit a proposal, which may include a time-phased process schedule to indicate the various processes, subprocesses, and/or events to be executed during a period of performance. Thus, a proposed schedule may indicate certain activities, many of which are scheduled to be performed prior to initiation of certain other activities. For example, a contractor proposing to construct a freeway bypass, bridge, or other structure, may begin with surveying, excavation, and grading prior to preparation of rebar substructures and form setting, which may be followed by pouring concrete, masonry, and other processes. In many instances, detailed scheduling of construction activities may be subject to oversight by a contracting officer, who may be tasked with ensuring that a contractor performs all needed activities, preferably in accordance with the proposed schedule and a proposed budget.

However, in some instances, a contractor, for example, may experience difficulties in adhering to an agreed-upon schedule of a multi-event construction process. In such instances, the contractor, for example, may wish to revise and/or update the agreed-upon schedule so as to reschedule certain activities. Such replanning of construction activities may be based, at least in part, on delays due to weather, availability of materials, equipment, availability of appropriate tradespeople, unplanned and/or unscheduled work stoppages, holidays, workplace mishaps, and so forth.

Consequently, a contractor may prepare a revised schedule, which, hopefully, provides the contracting officer or other overseer, for example, with a revised time-phased process schedule that indicates the contractor's plan for minimizing delays, cost overruns, and so forth. Such re-scheduling of the various time-phased processes may influence the contracting officer's scheduling of progress payments made to the contractor as well as allocating certain resources that the contractor may need to complete the multi-event process. In many instances, however, such contractor-provided schedule updates may be suspect, obscured, or not readily available so as to provide little insight into the contractor's actual plan of the multi-event process. Accordingly, improvements in multi-event scheduling continues to be an active area of investigation.

SUMMARY

One general aspect includes a computer-implemented method of modeling a multi-event process, the method includes loading into one or more computer memory devices, a digitized representation of a plurality of events of the multi-event process, a first one or more of the plurality of events being linked to a previous first one or more, or to a previous second one or more, of the plurality of events. The computer-implemented method also includes generating, via a display device coupled to one or more computer processors in communication with the one or more computer memory devices, a first visual representation including one or more visual indicators to represent progress of the first one or more of the plurality of events. The computer-implemented method also includes modifying one or more attributes of the first one or more of the plurality of events or of the second one or more of the plurality of events. The computer-implemented method also includes computing a progress profile of the first one or more events based, at least in part, on the one or more modified attributes of the previous first one or more, or of the previous second one or more, of the plurality of events. The computer-implemented method also includes generating, via the display device, a second visual representation representing the progress profile of the first one or more events based, at least in part, on the one or more modified attributes of the previous first one or more, or of the previous second one or more, of the plurality of events. Other embodiments of this aspect include corresponding computer systems, apparatus, and computer programs recorded on one or more computer storage devices, each configured to perform the actions of the methods.

In particular embodiments, the one or more modified attributes of the previous first one or more of the plurality of events, or of the previous second one or more, of the plurality of events, corresponds to a progress profile of the previous first one or more events or of the previous second one or more events accumulated over a duration. In particular embodiments, the one or more modified attributes of the first one or more events correspond to a performance factor of the first one or more events during a past duration. In particular embodiments, the method further includes selecting, via a user interface, one of a plurality of selectable time periods to represent progress of the first one or more events over a future duration. In particular embodiments, the one or more modified attributes of the previous first one or more events, or of the previous second one or more events, corresponds to a start date of the first one or more events or of the second one or more events. In particular embodiments, the one or more modified attributes of the previous second one or more events corresponds to an end date of the previous second one or more events. In particular embodiments, at least one of the first one or more events is linked to the second one or more events such that at least one of the first one or more events does not initiate until completion of at least a percentage of the at least one of the second one or more events. In particular embodiments, recomputing the progress profile of the first one or more events includes respreading the first one or more events over a future duration. In particular embodiments, respreading the progress profile of first one or more events includes respreading an increasing or a decreasing rate of progress over the future duration. In particular embodiments, the first or the second visual representations correspond to visual indicators of a bar graph. Implementations of the described techniques may include hardware, a method or process, or computer software on a computer-accessible medium.

Another general aspect includes an apparatus coupled to a display device to model a multi-event process, the apparatus including at least one processor coupled to one or more computer memory devices to load into one or more computer memory devices, a digitized representation of a plurality of events of the multi-event process, a first one or more of the plurality of events to be linked to a previous first one or more, or to a previous second one or more, of the plurality of events. The at least one processor coupled to one or more computer memory devices may also generate, via the display device coupled to the at least one computer processor coupled to the one or more computer memory devices, a first visual representation including one or more visual indicators to represent progress of the first one or more of the plurality of events. At least one processor coupled to one or more computer memory devices may also operate to modify one or more attributes of the previous first one or more of the plurality of events or of the previous second one or more, of the plurality of events. The at least one processor coupled to one or more computer memory devices may also compute a progress profile of the first one or more events based, at least in part, on the one or more modified attributes of the previous first one or more or of the previous second one or more, of the plurality of events. The at least one computer processor coupled to one or more computer memory devices may also operate to generate, via the display device, a second visual representation to represent the progress profile of the first one or more events based, at least in part, on the one or more modified attributes of the previous first one or more or of the previous second one or more, of the plurality of events.

In particular embodiments, the one or more modified attributes of the previous first one or more of the plurality of events, or of the previous second one or more of the plurality events, is to correspond to a progress profile of the previous first one or more events or of the previous second one or more events accumulated over a past duration. In particular embodiments, the one or more modified attributes of the first one or more events is to correspond to a performance factor of the first one or more events in a future duration. In particular embodiments, the at least one processor coupled to the one or more computer memory devices are further to select, responsive to one or more input signals from a user interface, one of a plurality of selectable time periods to represent progress of the first one or more events within a predetermined duration. In particular embodiments, the one or more modified attributes of the previous first one or more events, or of the previous second one or more events, corresponds to a start date of the previous first one or more events or of the previous second one or more events. In particular embodiments, the one or more modified attributes of the previous second one or more events corresponds to an end date of the previous second one or more events.

Another general aspect relates to an article including one or more non-transitory computer-readable media having instructions encoded thereon which, when executed by one or more computer processors coupled to one or more computer memory devices, are operable to load into one or more computer memory devices, a digitized representation of a plurality of events of a multi-event process, a first one or more of the plurality of events are to be linked to a previous first one or more, or to a previous second one or more, of the plurality of events. The instructions may additionally operate to generate, via a display device coupled to the one or more computer processors coupled to the one or more computer memory devices, a first visual representation including one or more visual indicators to represent progress of the first one or more of the plurality of events. The instructions may additionally operate to modify one or more attributes of the previous first one or more of the plurality of events or of the previous second one or more, of the plurality of events. The instructions may additionally operate to compute a progress profile of the first one or more events based, at least in part, on the one or more modified attributes of the previous first one or more, or of the previous second one or more, of the plurality of events. The instructions may additionally operate to generate, via the display device, a second visual representation to represent the progress profile of the first one or more events based, at least in part, on the one or more modified attributes of the previous first one or more, or of the previous second one or more, of the plurality of events.

In particular embodiments, at least one of the first one or more events is to be linked to the second one or more events such that at least one of the first one or more events does not initiate until completion of at least a percentage of the at least one of the second one or more events. In particular embodiments, the one or more computer processors coupled to one or more computer memory devices is to recompute the progress profile of the first one or more of events is to include a respread the first one or more events over a future duration. In particular embodiments, the respread first one or more events over the future duration is to include a respread to indicate an increase or decrease in a rate of progress over the future duration.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, claimed subject matter may be best understood by reference to the following detailed description if read with the accompanying drawings in which:

FIG. 8-9 depicts a visual representation of a progress profile linked to a computer-implemented calendar tool to facilitate computer-implemented progress modeling of a multi-event process, according to embodiments; and.

Figure 1A:
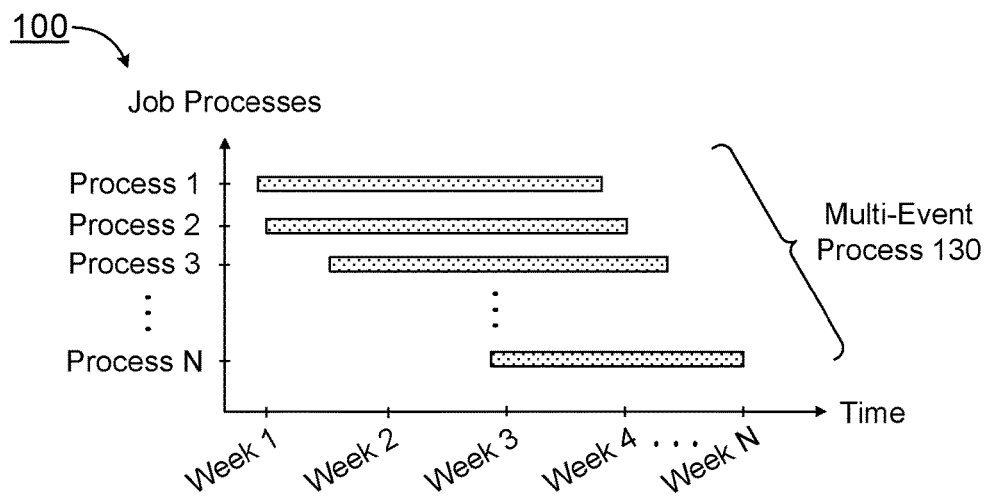
FIG. 1A depicts a visual representation of job processes in a schedule of a multi-event process to be performed at various points in time, according to an embodiment.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, process events may be reduced in number so as to simplify explanation of the various illustrative embodiments of subject matter embraced by the claims. In addition, it is to be understood that other embodiments may be utilized. Moreover, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, article claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same embodiment or to any one particular embodiment described. Furthermore, it is to be understood that particular features, structures, representations, indications and/or characteristics described are capable of being combined in various ways in one or more embodiments and, therefore, are within intended claim scope, for example. In general, of course, these and other issues vary with context. Therefore, particular context of description and/or usage provides guidance regarding inferences to be drawn.

As previously alluded to herein, a multi-event process, which may comprise various time-phase processes, subprocesses, events, and so forth, a contractor, for example, may submit a proposal, which may include a time-phased schedule of process events showing contractor obligations to achieve events on a periodic (e.g., daily, hourly, weekly, etc.) events at particular time intervals in accordance with the schedule. A time-phased process schedule, which may indicate process events to occur on a daily basis, weekly basis, monthly basis, etc., may be utilized to indicate the various processes, subprocesses, and/or events to be executed during a contractor's period of performance. Thus, a proposed schedule for completing a multi-event process may indicate certain time-phased activities, many of which may be scheduled to be performed prior to initiation of certain other activities. The duration and sequence of the time-phased activities may be utilized to drive a progress profile since such activities have resources assigned to them, thereby creating the time-phased progress profile. Accordingly, in many instances, there is a connection between or among scheduled activities and resources allotted to completing such scheduled activities. For example, a contractor proposing to construct a freeway bypass, bridge, chemical processing facility, refinery, or any other structure or system of structures, may begin with surveying, excavation, and/or grading prior to preparation of rebar substructures and form setting, piping, etc., which may be followed by pouring concrete, masonry, application of asphalt, and other processes. Some or all of such activities may be scheduled along with attendant resources utilized to complete the scheduled activities. Some or all of the above-mentioned events may be scheduled to occur at a rate of progress (e.g., hourly, daily, weekly, etc.) so as to meet a scheduled progress plan of a certain rate of completion over a larger period of time (e.g., monthly, quarterly, etc.). In many instances, detailed scheduling of construction activities may be subject to oversight by a contracting officer, who may be tasked with ensuring that the one or more contractors perform all needed activities, preferably in accordance with the proposed schedule and within a proposed budget.

However, in some instances, a contractor, for example, may experience difficulties in meeting scheduled progress toward completion of a multi-event construction process responsive to a lack of progress. In such instances, the contractor, for example, may wish to revise and/or update the agreed-upon schedule and/or progress plan so as to reschedule certain activities. Rescheduling and/or replanning of construction activities may place a premium on completing the multi-event process at a particular, and previously agreed-upon, completion date. In some instances, replanning and/or rescheduling of construction activities may be in response to construction delays due to unforeseen weather interruptions, a contractor performance factor, availability of materials, equipment constraints, availability of skilled tradespeople, unplanned and/or unscheduled work stoppages, holidays, workplace mishaps, and so forth.

Consequently, while executing a multi-event-process, a contractor may prepare a revised schedule, progress plan and/or other type of scheme for the completion of the multi-event process, which, hopefully, provides the contracting officer, customer, or other type of overseer, with a revised time-phased process schedule and progress obligations that specify, in appropriate detail, the contractor's plan or approach for minimizing delays, cost overruns, and so forth. Such re-scheduling of the various time-phased processes may influence the contracting officer's scheduling of progress payment intervals to be made to the contractor as well as allocating certain resources that the contractor may need to complete the multi-event process. In many instances, however, such contractor-provided schedule updates may be suspect, obscured, or not available in a timely manner. Accordingly, in some instances, contractor-provided schedule and or progress plan updates may provide little insight into the contractor's actual plan for completion of the multi-event process, which may include a revised progress for completion one or more events of the multi-process event.

In an example, a contractor may utilize a typical scheduling tool that does not provide sufficient granularity in identifying events of various processes and/or subprocesses of a multi-event process. Thus, in such instances, a contractor may provide a contracting officer, customer, or other overseer, with a revised schedule that includes only a handful (e.g., 7, 10, or 15, or more or less) of replanned process events, which may not embody sufficient detail to appropriately advise the contracting officer, customer, or other overseer. Further, typical scheduling tools may operate in an unwieldy manner, which may not permit the contractor to provide timely updates to the contracting officer or other overseer. Such typical scheduling tools may thus permit a contractor to hide or obscure replanned/rescheduled details of a multi-event process. In addition, generating and/or providing a revised and up-to-date progress profile may be difficult and cumbersome given typical computer-implemented (e.g., software) tools. Such hiding or obscuration of replanned details of a multi-event process may place the contracting officer, customer, or other type of overseer into a state of relative ignorance as to which processes, subprocesses, and/or events of the multi-event process are being delayed and/or impacted.

Accordingly, in particular embodiments, a computer-implemented progress modeling tool for a multi-event process may overcome a number of shortcomings present in typical scheduling tools. Thus, such a computer-implemented progress modeling tool may operate as an assurance service that provides a contracting officer, customer, or other overseer with a tool that assures that the overseer maintains a primary commercial avenue for verifying and/or validating (or can call into question with ample evidence) that the contractor-provided schedule is, or is not, feasible.

For example, in an embodiment, a computer-implemented progress modeling tool may provide visual representations, such as a bar graph, Gantt chart, or other indication, that quickly and interactively displays respread progress of events of a process in response to modifying an attribute of one or more predecessor events. In this context the term "respread" or forms thereof, refers to rescheduling and/or replanning of progress so as to meet a revised start date or completion date. Thus, a previous or predecessor event may bring about respreading of progress to a revised completion or start date. In one example sense, respreading of a progress profile operates akin to an accordion. In response to a side of an accordion being extended, the accordion flattens. In addition, in response to an opposite side of the accordion being extended, the accordion flattens by a further amount. In response to one or more sides of the accordion being pushed inward (e.g., contracted) a center portion of the accordion increases in height.

Also this context, the term "attribute" refers to a parameter relating to one or more events. Thus, for example, an attribute of an originally scheduled predecessor event may refer, for example, to a date of completion of the predecessor event. Accordingly, also in this context, a "modified attribute" may refer to a modification of a parameter of a predecessor event. A modified attribute of a predecessor event may thus refer to a delay in completing one or more predecessor events, a shortening of a duration of one or more predecessor events, or modifying any other parameter of the predecessor event.

For example, in an embodiment, in response to modifying an attribute of the predecessor event, such as realizing a delay in completion of one or more predecessor events of a series of time-phased events, a computer implemented modeling tool may include a facility to permit a user to indicate that remaining events of the series of events are to be completed at a faster rate (e.g., a greater percentage of completion per day, per week, per month, etc.) so as to maintain an agreed-upon completion date. Thus, in one possible example, in response to a two-week weather or holiday delay, which affects the rate at which concrete can be poured, a computer-implemented progress modeling tool may indicate that a contractor may be required to pour concrete at a faster rate during the remaining weeks allocated for concrete pouring events.

In another embodiment, a computer-implemented progress modeling tool for a multi-event process may be utilized to quickly and interactively display visual representations of respread events of a first process in response to, for example, a delay in completing one or more predecessor events of a second process. For example, in a possible embodiment, in response to a process comprising laying of underground pipes in a multi-event process of constructing an oil refinery, a two-week delay in fabricating and laying pipes into open trenches, such as due to holiday-related personnel shortages or any other event that affects a contractor performance factor, may delay a first process pipe weld inspection and/or covering of completed pipe trenches with earth. In such an instance, in view of the two-week delay in constructing and laying pipes, a contractor may be tasked with increasing a rate of pipe weld inspection and covering of completed pipe trenches during the remaining weeks allocated for covering piped-out trenches with earth or other materials.

In particular embodiments, one or more predecessor events may be linked or coupled to a time-phased schedule of process events. In this context, a "link" between a predecessor event of the time-phased schedule of process events refers to a relationship between the predecessor and subsequent process events, in which the predecessor event is to be completed prior to or coincident with initiation of the time-phased schedule of process events. Accordingly, in an example, a predecessor inspection event that refers to inspection of pipe weld quality may be essential prior to covering a piped-out trench with earth. In another example, a predecessor event may be "linked" to a plurality of time-phased process events. Thus, in an example, a predecessor event relating to assembly of a concrete-mixing facility, or completed up to a certain percentage, may be scheduled to occur prior to two or more time-phased process events, such as surveying, obtaining one or more concrete pumps, form setting, and so forth.

In addition, in some embodiments, computer-implemented progress modeling of a multi-event process may be performed utilizing a computing platform that facilitates interactive real-time or near-real-time viewing of various contingency scenarios. Thus, based, at least in part, on computing power of a computing platform, such as via the use of multiple processors, enhanced memory caching, and/or other computer hardware features, a contracting officer or other overseer may be capable of interactively generating visual representations of revised scheduling details with merely a few computer keystrokes. Thus, it may be appreciated that computer-implemented progress modeling of a multi-event process may provide the ability to interactively generate numerous informal or "what if" speculations based on virtually any number of scenarios, for example, in completing scheduled events of a multi-event process.

It may be appreciated that, at least in particular embodiments, an ability to quickly and/or interactively replan and/or reschedule events of a multi-event process, may be instrumental in assisting a contractor, for example, in avoiding certain scenarios in which a delay of one or more process events gives rise to an undesirable "bow wave" of activity at a future date of a scheduled process. In this context, the term "bow wave" refers to an undesirable accumulation of effects of an estimation process in which one or more delays in a sequential series of events leads to a burst of activity at a future date. In many instances, a bow wave occurs as a result of holding a completion date firm while resources required to complete a process to achieve such a completion date are increased. In one possible example, if a series of process events involves pouring concrete at a completion rate of 5% per week for 20 weeks, a shortcoming in weekly concrete pouring events, such as pouring concrete at a rate of 4% per week for 19 weeks, leads to a need to pour a remaining 24% of concrete at week 20. Thus, it may be appreciated that precluding such "bow wave" events from occurring may serve the interests of contractors as well as contracting officers and/or customers alike.

In particular embodiments, computer modeling of a multi-event process may facilitate the interactive generation of visual representations showing increasing rates of progress (e.g., "ramp up") over time as well as decreasing rates (e.g., "ramp down") of progress. Thus, in one possible example, as rainy weather decreases during spring and summer months, process events may be interactively scheduled and visually represented to show increases, such as from a progress profile of 3% per week in March to a progress profile of 6% per week in June, followed by, for example, a progress profile that returns to 3% during rain-prone November.

FIG. 1A depicts a visual representation of job processes in a schedule of a multi-event process to be performed at various points in time, according to an embodiment 100. As depicted in FIG. 1A, the vertical axis depicts job processes, and the horizontal axis depicts time in weeks. Thus, as shown, process 1 initiates at week 1 and completes at week 4. Process 2 is shown as initiating at week 1 slightly after process 1 and completing at week 4, slightly after completion of process 1. Process 3 is shown as initiating at a middle point of week 1 and completing at a middle point of week 4. It should be understood that processes of FIG. 1A may include any number of processes similar to processes 1, 2, and 3, such as 10 processes, 20 processes, hundreds of processes, or even thousands of job processes. Accordingly, process N may represent any number of processes of a multi-event process, virtually without limitation.

As depicted in FIG. 1A, processes of multi-event process 130 are intended to reflect discrete processes of any type of multi-event process. Thus, process 1 may refer to, for example, excavation, such as excavation in preparation for constructing a road or highway. Process 2, for example, may refer to hauling excavated earth from a construction site, while process 3, for example, may refer to surveying of excavated areas in preparation for depositing a capping layer, over which asphalt and other materials may be deposited. Processes 1, 2, 3, . . . , N are intended to comprise discrete "events," which, in this context, refer to one or more discrete occurrences, which may be performed over a period of days, weeks, months, years, or any other discrete period of time. Thus, in a possible example, process 1 may involve excavating, which comprises 4 weekly events of removal of 25% of a total area (or volume) to be excavated.

Figure 1B:
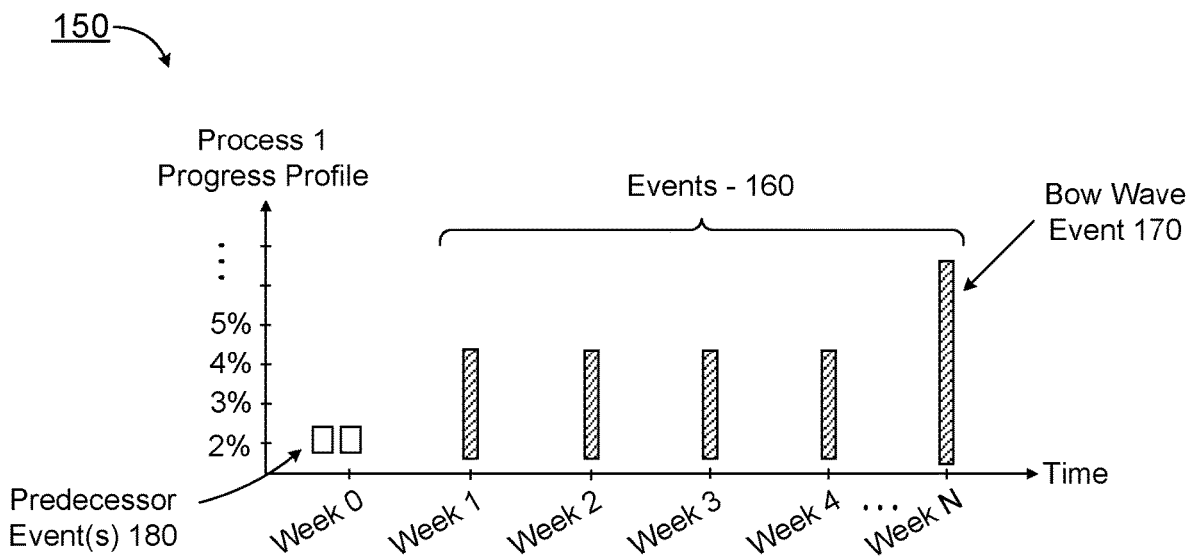
FIG. 1B depicts a visual representation of a progress profile of process events over a period of weeks, according to an embodiment.

FIG. 1B depicts a visual representation of a progress profile of process events over a period of weeks, according to an embodiment 150. As depicted in FIG. 1B, the vertical axis depicts a progress profile of process 1, which may occur via weekly events 160 spread over weeks 1-N. As shown, events 160 represent a weekly completion rate of approximately 4% per week at least through weeks 1-4. However, as is also shown in FIG. 1B, an accumulation of the effects of a progress profile reflecting completion of process events 160 of 4% over a 4-week period leads to bow wave event 170, which indicates that the contractor must make progress at a rate of more than 6% per week at week N, so as to reflect 100% completion of the process at week N. As noted previously herein, such bow wave events can be avoided via timely replanning/rescheduling via computer-implemented progress modeling of multi-event processes. Further, in particular embodiments, computer-implemented progress modeling of a multi-event process may facilitate the interactive real-time or near-real-time modeling of the events of a process, so as to warn a contractor and other concerned parties of an impending, and potentially unmanageable, bow wave of progress at week N.

As is also shown in FIG. 1B, predecessor event 180 may impact completion of events 160 of a scheduled process. In particular embodiments, predecessor event 180 may refer to one or more previous events of a process similar to process events 160. Accordingly, predecessor event 180 may refer to a percentage of a completion state of events similar to those of events 160. Thus, for example, predecessor event 180 may represent an accumulation of one or more events, such as excavating earth, similar to events 160 that may also pertain to excavating earth. In this context, predecessor event 180 may represent a plurality of past weekly events. For example, predecessor event 180 may indicate progress to date of excavation during several preceding weeks during a flood season, in which only marginal clean progress has been made toward excavating a total area or volume of earth that is to be excavated.

Figure 2:
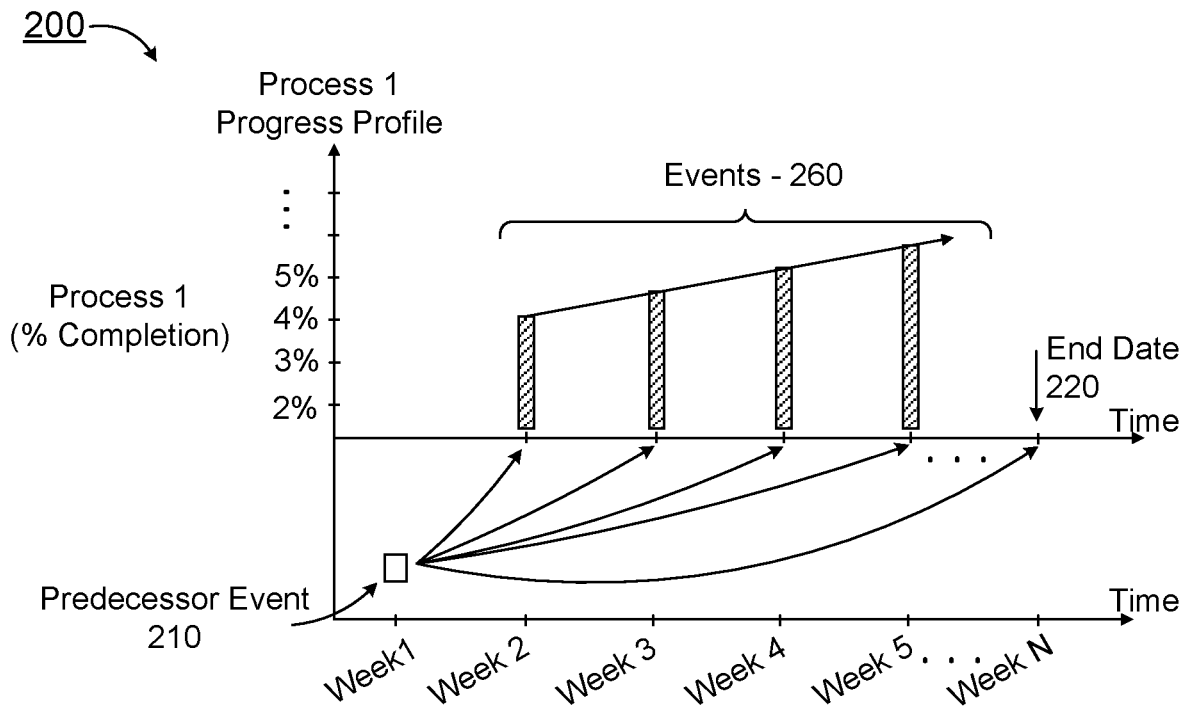
FIG. 2 depicts a visual representation of a progress profile of process events and a resultant bow wave in response to a shortcoming in weekly progress, according to an embodiment.

FIG. 2 depicts a visual representation of respreading of process events in response to delayed completion of a predecessor second event, according to an embodiment 200. In the embodiment of FIG. 2, events 260 represent a respreading of events 160 (of FIG. 1B). Such respreading operates to avoid bow wave 170 shown in FIG. 1B. Thus, as shown, in response to a contractor incrementally increasing a rate of progress of events 160, the contractor may avoid potentially unmanageable bow wave 170. In the example of FIG. 2, responsive to a contractor increasing the rate of progress of events 160, such as from approximately 3% at week 2 to approximately 5% at week 5, the contractor may be assured that the process that includes events 160 may be completed by an end date, given by arrow 220 at week N. Such increases in the rate of progress may be brought about by increasing a performance factor of events 160, which may include adding personnel and/or equipment resources, engaging a specialized sub-tier contractor, and so forth.

FIG. 2 additionally depicts predecessor event 210, which may refer to an event of a process that is different from a process encompassing events 160. For example, predecessor event 210 may refer to one or more inspections, which may be scheduled to occur prior to initiation of time-phased events 160. In one possible scenario, prior to excavation of material from a jobsite, one or more environmental impact studies may be scheduled for submittal and/or approval, which may delay excavation events 160. However, by way of a computer-implemented progress model of a multi-event process, a contractor, overseer, or other interested party, may visually represent a revised progress profile of events 160, so as to avoid bow wave 170 of FIG. 1B by increasing weekly progress by incremental amounts.

Figure 3:
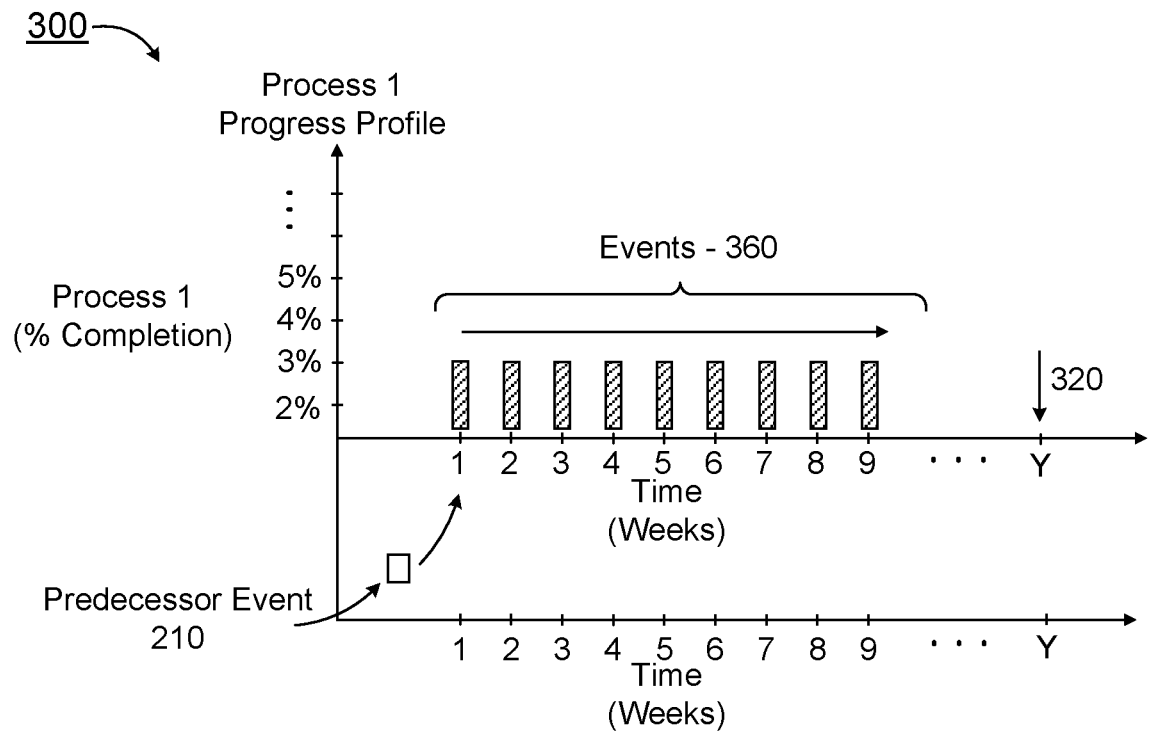
FIG. 3 depicts a visual representation of respreading of process events in response to delayed completion of a predecessor event, according to an embodiment.

FIG. 3 depicts a visual representation of respreading of process events in response to delayed completion of two predecessor process events, according to an embodiment 300. In FIG. 3, rather than increasing a rate of completion of time-phased process events, such as depicted in reference to FIG. 2, time-phased events 360 may be spread to reflect a completion rate of 3% per week over a duration of greater than 9-weeks. Such respreading of time-phased events over a longer duration (e.g., greater than 9-weeks) may avoid a need for an increased rate of completion of process events, which may be, at least in particular instances, difficult to achieve. However, such respreading of time-phased events, as shown, delays completion of events 360, in which a completion date has been moved to end date 320. It may be appreciated that such computer-implemented progress modeling of a multi-event process may be instrumental in providing real-time or near-real-time notification that a completion date for certain events may extend beyond the previously-scheduled completion date.

Figure 4:
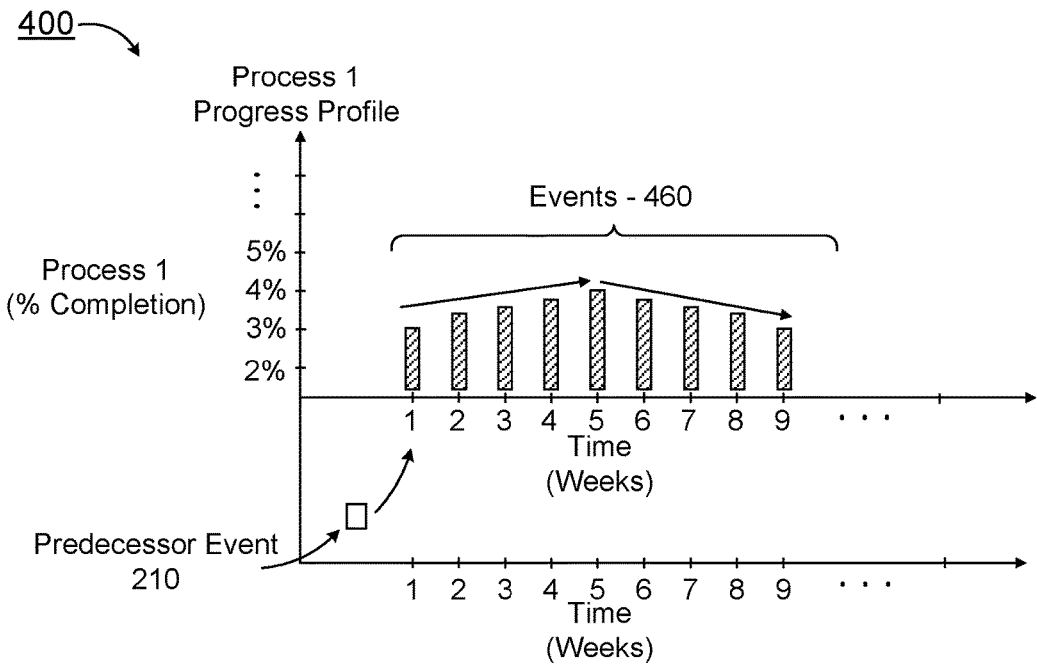
FIG. 4 depicts a visual representation of respread process events, indicating increasing and decreasing rates of progress, in response to delayed completion of a predecessor event, according to an embodiment.

FIG. 4 depicts a visual representation of respreading of process events in response to completion of a predecessor event, in which process completion rates are first increased and then later decreased, according to an embodiment 400. Thus, as indicated in FIG. 4, a completion rate of time-phased events 460 may be scheduled to increase from a completion rate of approximately 3% per week at week 1 to a completion rate of approximately 4% at week 5 before returning to a completion rate of approximately 3% at week 9.

Figure 5:
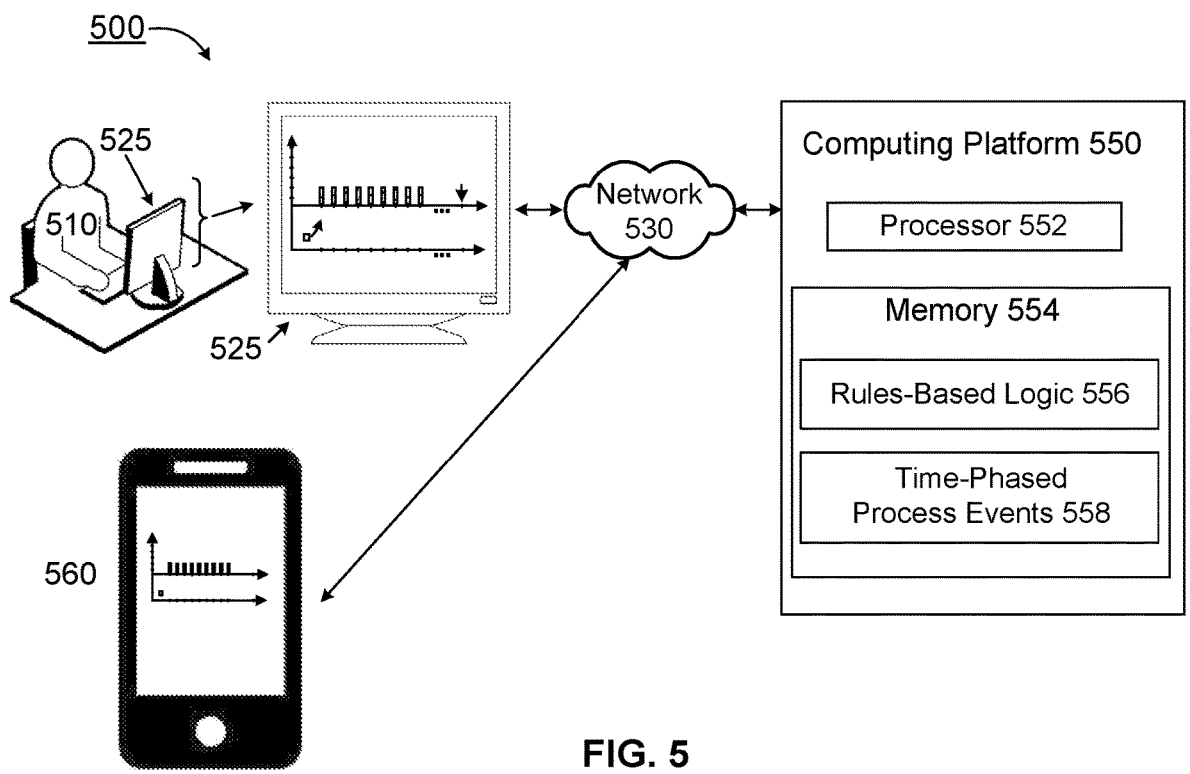
FIG. 5, depicts a user interacting with a computing platform to respread process events, which may result in generation of visual representations of process events of a multi-process event, according to an embodiment.

FIG. 5 is a schematic diagram showing a user interacting with a user interface to utilize a computer-implemented progress model of a multi-event process, according to an embodiment 500. In FIG. 5, user 510 may interact with computing platform 550, such as via intervening network 530, to perform real-time or near-real-time replanning and/or rescheduling events of a particular process of the multi-event process. Accordingly, user 510 may generate, for example, numerous formal or informal speculations based on virtually any number of scenarios, for example, in completing scheduled events of a multi-event process. Display device 525 may operate to display visual representations of any graphs previously discussed with respect to FIG. 1-4 herein. In addition, display device 555 may permit user 510 to select to display visual representations of graphs graduated to show time-phased events representing daily progress, weekly progress, monthly progress, or any other user-selectable graduation of time-based events, and claimed subject matter is not limited in this respect.

Although FIGS. 1-5 relate to computer-implemented progress models of a multi-process event within the context of a construction project, it may be appreciated that such embodiments, or other embodiments, may relate to a variety of other industries. For example, within a financial context, an individual or an entity may allocate certain financial resources in accordance with an originally-proposed set of time-phased events, such as $1000 per month. However, in the event that actual allocations (e.g., one or more predecessor events) fall short (e.g., allocating only $750 per month) a computer-implemented progress model may alert a financial officer, for example, that monthly allocation events are to be increased in order to reach an end goal that relates to a total allocation of financial resources. In another example, with respect to a business entity engaged in selling products, an originally proposed sales schedule may forecast sales of 1000 units per month. However, responsive to actual sales (predecessor events) falling short of forecast sales (e.g., sales of only 500 units per month) a sales manager may be alerted so as to increase sales efforts over future months so as to realize particular sales of total units by a future date.

Computing platform 550 of FIG. 5 may comprise one or more of processor 552, which may be coupled to one or more memory devices, such as memory 554. Memory 554 may comprise a memory array, such as a two or three dimensional memory array, which may be loaded so as to implement rules-based logic 556. Rules-based logic 556 may operate to link various time-phased process events, such as time-based process events 558. In particular embodiments, processor 552 may execute a computer program to implement a spreadsheet application so as to facilitate display and/or evaluation of virtually any number of originally proposed or respread process events, such as those described previously herein.

In an embodiment, user 510 may interact with a spreadsheet application operating on mobile device 560, which may facilitate the same or similar interactions performed via a user interface of computing platform 550. Thus, mobile device 560 may cooperate with computing platform 550 to implement rules-based logic to display originally proposed and/or respread events of a multi-event process. In another embodiment, mobile device 560 may include a suitable processor coupled to a memory device to implement rules-based logic to display original and/or respread events in a standalone manner, such as without aid or cooperation with computing platform 550.

Figure 6:
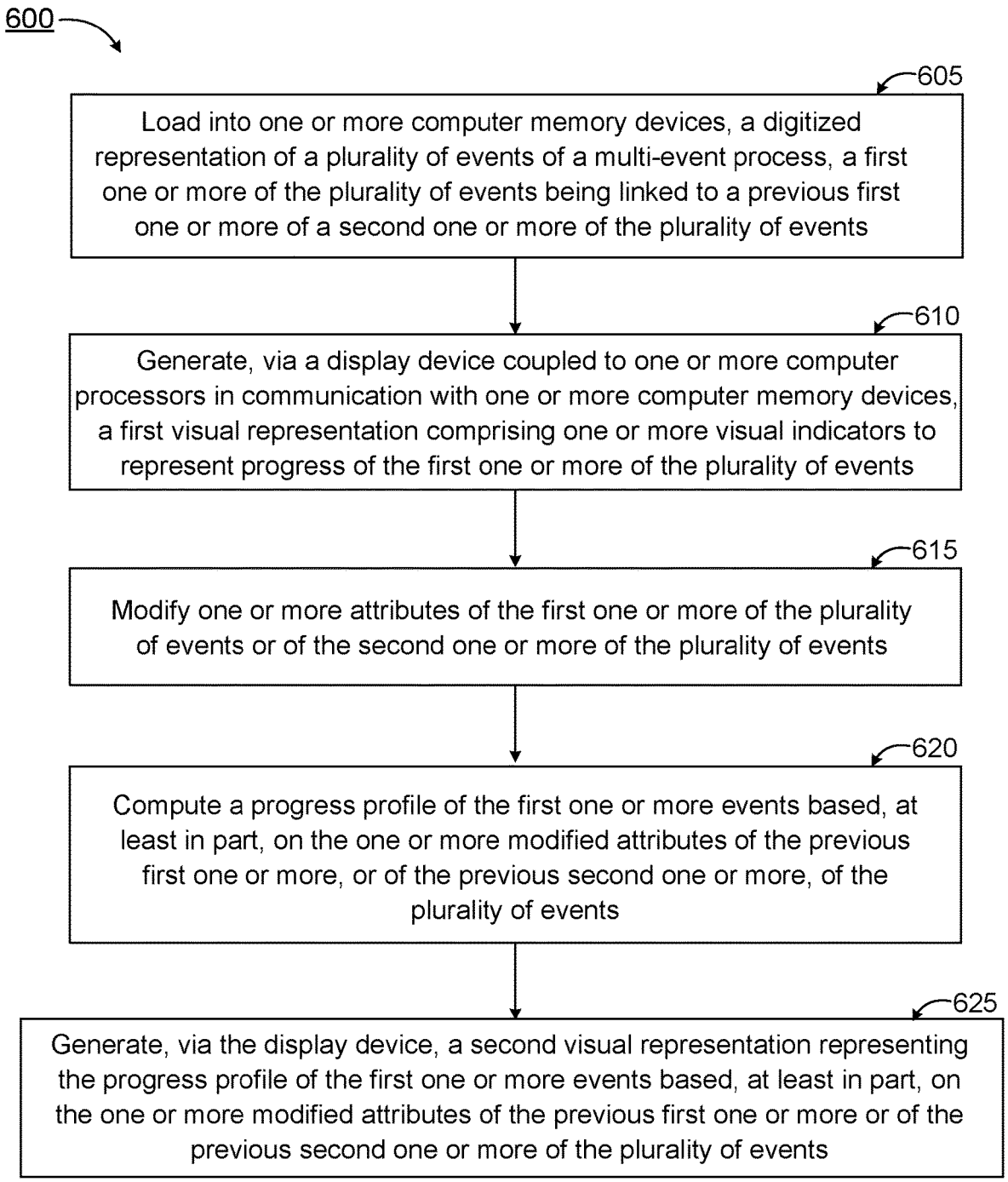
FIG. 6 depicts a flowchart for a method for computer-implemented progress modeling of a multi-event process, according to an embodiment.

FIG. 6, depicts a flowchart for a method for computer-implemented progress modeling of a multi-event process, according to an embodiment 600. Embodiments in accordance with claimed subject matter may include all of the actions depicted at 605-625, fewer actions than those depicted at 605-625 and/or more actions than those depicted at 605-625. Likewise, it should be noted that content acquired or produced, such as, for example, input signals, output signals, operations, results, etc., brought about by the example process of embodiment 600 may be represented via one or more digital signals and/or digital signal states. It should also be appreciated that even though one or more operations are illustrated or described concurrently or with respect to a certain sequence, other sequences or concurrent operations may be performed. In addition, although the description below references particular aspects and/or features illustrated in certain other figures, one or more operations may be performed with other aspects and/or features. In embodiments, blocks 605-625 may be communicated as one or more signals and/or signal packets among various software, firmware and/or hardware services executed at a computing device, such as computing platform 550.

The embodiment of FIG. 6 may begin at 605, which may include loading into one or more computer memory devices, a digitized representation of a plurality of events of a multi-event of process. A first one or more of the plurality of events may be linked to a previous first one or more of the plurality of events. Alternatively, at 605, a first one or more of the plurality of events may be linked to a second one or more of the plurality of events. The method may continue at 610, which may include generating a first visual representation, such as via a display device coupled to one or more computer processors in communication with one or more computer memory devices, one or more visual indicators to represent progress of the first one or more of the plurality of events.

The method may continue at 615, which may include modifying one or more attributes of the first one or more of the plurality of events or of the second of the one or more of the plurality of events. The method may continue at 620, which may include computing a progress profile of the first one or more events based, at least in part, on the one or more modified attributes (e.g., as modified in accordance with 615) of the first one or more, or of the second one or more, of the plurality of events. The method may continue at 625, which may include generating a second visual representation, via the display device, based, at least in part, on the one or more modified attributes of the first one or more or of the second one or more of the plurality of events.

Figure 7:
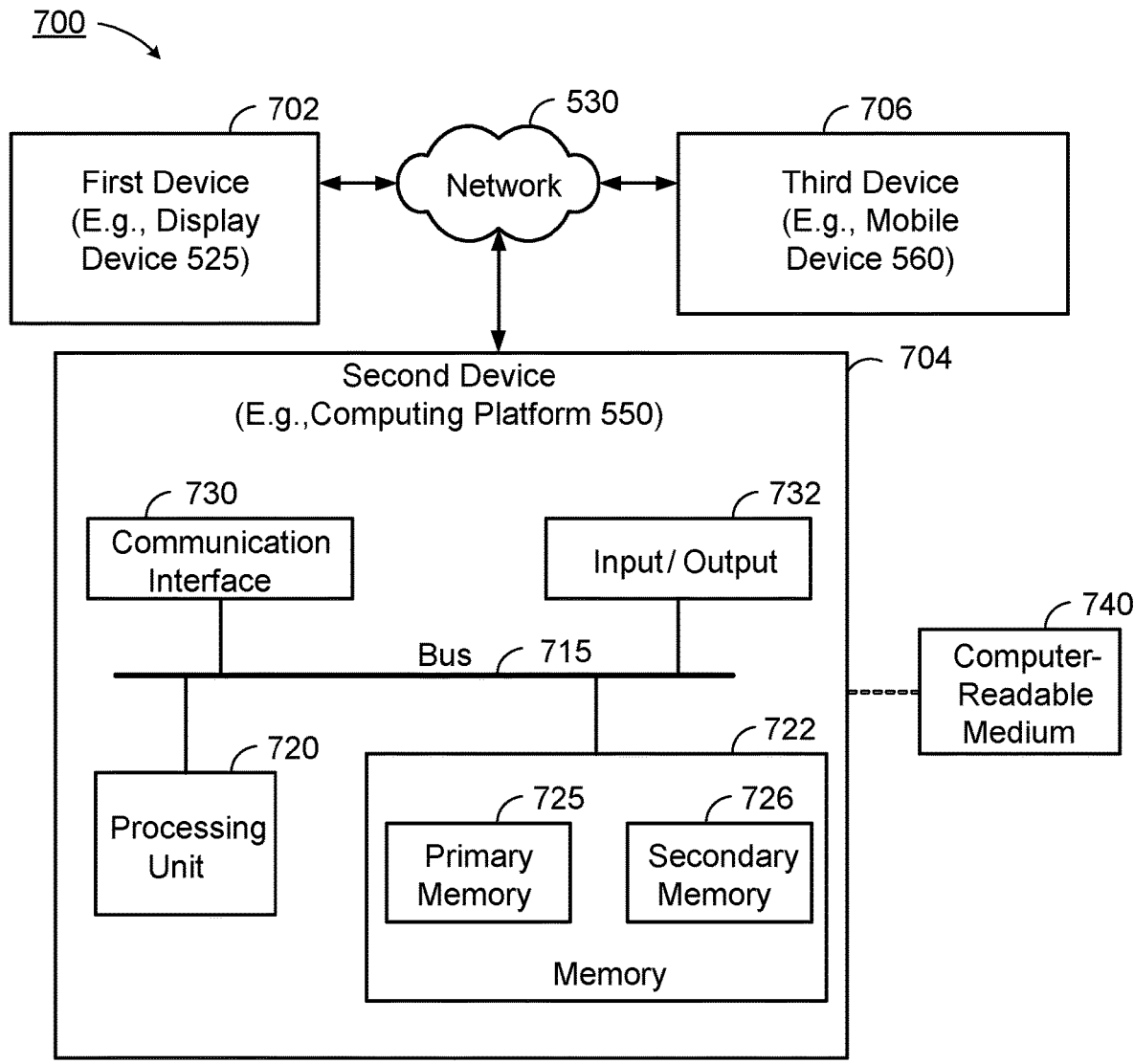
FIG. 7 is a schematic block diagram illustrating an example computing system environment, according to an embodiment.

FIG. 7 is a schematic block diagram illustrating a computing environment to facilitate computer-implemented progress modeling of a multi-event process, according to an embodiment 700. In the embodiment of FIG. 7, first device 702 may comprise a computer user interface and a display device, such as display device 525 of FIG. 5. Second device 704, may comprise, for example, computing platform 550, which may permit the user to interact with a spreadsheet program, for example, to facilitate modeling of a multi-event process. Third device 706 may comprise a mobile device, such as mobile device 560, which may include a user interface, a computer processor, and one or more computer memory devices, to allow the user, such as user 510, to interact with a spreadsheet program, for example, which may facilitate modeling of a multi-event process. Network 530 may comprise any type of ethernet, LAN, or Internet-based computing network, similar to network 530 of FIG. 5. Processing unit 720 and memory 722, which may comprise primary memory 725 and secondary memory 726, may communicate by way of a communication interface 730, for example, and/or input/output module 732. The terms "computing device," "computing platform," or "computing resource" in the context of the present application, refer to a system and/or a device, such as a computing apparatus that includes a capability to process (e.g., perform computations) and/or store digital content, such as electronic files, electronic documents, text, images, video, audio, etc., in the form of signals and/or signal states. Thus, a computing platform, in the setting or environment of the present patent application, may comprise hardware, software, firmware, or any combination thereof (other than software per se). Computing device 704 (e.g., second device), as depicted in FIG. 7, is merely one example, and claimed subject matter is not limited in scope to this particular example.

In FIG. 7, first device 702, second device 704, and third device 706 may provide one or more sources of executable computer instructions in the form of physical states and/or signals (e.g., stored in memory states), for example. First device 702 may communicate with second device 704 by way of a network connection, such as via network 530 as previously mentioned, for example. It may be appreciated that a connection, while physical, may be virtual and not necessarily be tangible. Although second device 704 of FIG. 7 depicts various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage device or system of devices. Memory 722 may comprise, for example, primary memory 725 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may comprise one or more articles utilized to store a program of executable computer instructions. For example, processing unit 720 may fetch executable instructions from memory and proceed to execute the fetched instructions. Memory 722 may also comprise a memory controller for accessing computer-readable medium 740 that may carry and/or make accessible digital content, which may include code, and/or instructions, for example, executable by processing unit 720 and/or any other device, such as a controller, as one example, capable of executing computer instructions, for example. Under direction of processing unit 720, a non-transitory memory, such as memory cells storing physical states (e.g., memory states), comprising, for example, a program of executable computer instructions, may be executed by processing unit 720 and be capable of generating signals to be communicated via a network, for example, as previously described. Generated signals, and/or signal states, may also be stored in memory, also previously suggested.

Memory 722 may store electronic files and/or electronic documents, such as relating to one or more users, and may also comprise a machine-readable medium that may carry and/or make accessible content, including code and/or instructions, for example, executable by processing unit 720 and/or any other type of programmable device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document, such as a spreadsheet. That is, it is not meant to implicitly reference a particular syntax, format and/or approach used, for example, with respect to a set of associated memory states and/or a set of associated physical signals. It may be appreciated that an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Example devices in FIG. 7 may comprise features, for example, of a client computing device and/or a remote/server computing device, in an embodiment. It is further noted that the term computing device, in general, whether employed as a client and/or as a server, or otherwise, refers at least to a processor and a memory connected by communications bus 715. A "processor," such as a processor of a computing platform, for example, is understood to refer to a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor," "computing platform," and/or similar terms; however, if it is determined, for some reason not immediately apparent, that the foregoing understanding cannot stand and that 35 USC § 112 (f), therefore, necessarily is implicated by the use of the term "computing device," "processor," computing platform," and/or similar terms, then, it is intended, pursuant to that statutory section, that corresponding structure, material and/or acts for performing one or more functions be understood and be interpreted to be described in the figures shown and described herein.

Figure 8:
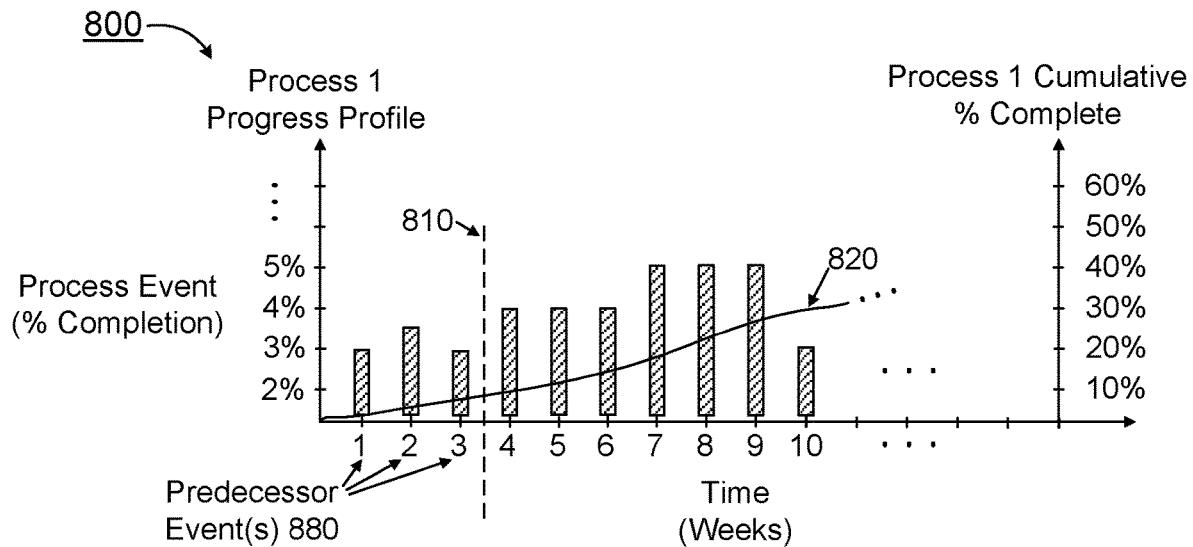

As a particular additional embodiment (800), FIG. 8 depicts a visual representation of respreading of process events in response to linking of a computer-implemented progress model for a multi-event process with a computer-implemented calendaring tool. In the embodiment of FIG. 8, predecessor events 880 of a multi-event process are indicated as being prior to dotted line 810, which separates preceding (actual) events from events scheduled to occur during a future duration. A progress profile of process 1 (in percentages) is indicated at the vertical axis at the left side of FIG. 8, and a measure of cumulative progress toward completion is indicated at the vertical axis at the right side of FIG. 8. Line 820 indicates a measure of cumulative progress so as to account for incremental (e.g., weekly) progress toward completion of process 1.

In the embodiment of FIG. 8, events occurring at weeks 4, 5, and 6 may be constrained to correspond to a completion rate of 4% per week. Additionally, events occurring at weeks 7, 8, and 9 may be constrained to correspond to a completion rate of 5% per week. In particular embodiments, such constraints may be realized by linking, for example, a computer-implemented spreadsheet with a computer-implemented calendaring tool. In such a scenario, in view of constraints placed upon rates of completion at weeks 4-7, a computer-implemented progress model of a multi-event process may respread events beginning at week 10, so as to indicate a desired a cumulative completion of approximately 30% at week 10 and beyond. It may be appreciated that such linking of a computer-implemented spreadsheet with a calendaring tool may facilitate generation of a respread progress profile that facilitates a user (e.g., user 510 of FIG. 5) to impart a particular shape or form to line 820 in a way that may be useful to a contractor or to a contracting officer, a customer, or other overseer. In addition, respreading of events of a progress profile may be computed and/or represented to show increasing rates of progress over time (e.g., "ramp up") as well as decreasing rates of progress (e.g., "ramp down"). Moreover, responsive to establishing rules-based logic, such as via rules-based logic 556 of FIG. 5, a user may be able to establish logical links between calendaring events and time-phased events.

Table 1 (below) depicts entries to a computer-implemented spreadsheet showing weekly progress events linked to a computer-implemented calendaring program to indicate a contractor performance Index (CPI) of 1.0 as a spread among weeks 4-9.

TABLE 1

| CPI Adjustment | Week 4 | Week 5 | Week 6 | Week 7 | Week 8 | Week 9 |
|---|---|---|---|---|---|---|
| 1.0 | 4.0% | 4.0% | 4.0% | | | |
| 1.0 | | | | 5.0% | 5.0% | 5.0% |

Figure 9:
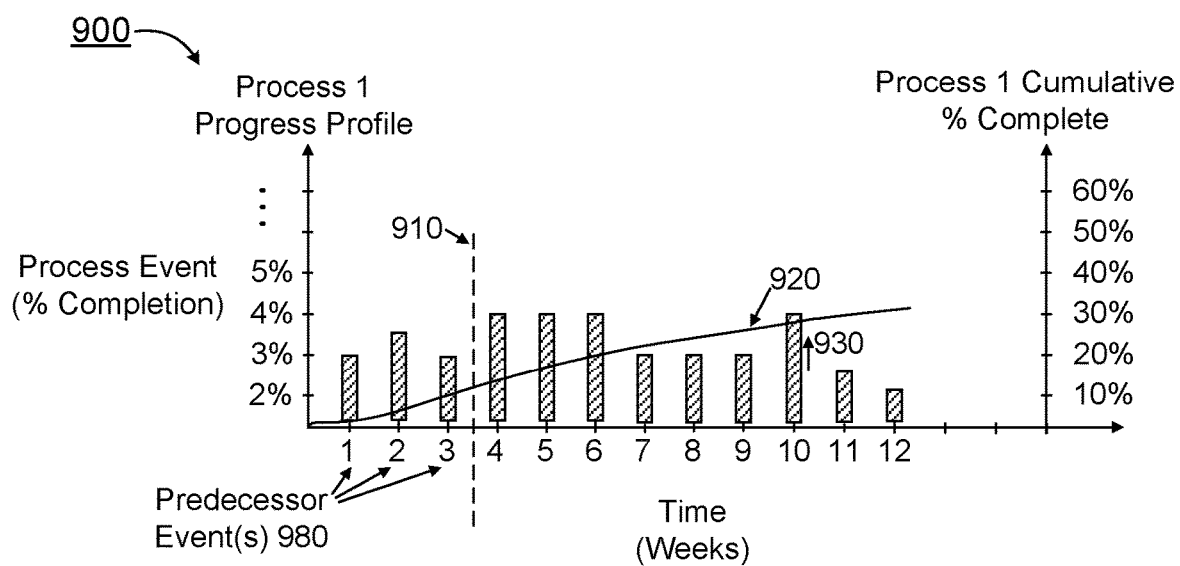

In a particular additional embodiment (900), FIG. 9 depicts a visual representation of respreading of process events in response to linking of a computer-implemented progress model for a multi-event process with a computer-implemented calendaring tool. In the embodiment of FIG. 9, predecessor events of a multi-event process are indicated as being prior to dotted line 910, which separates preceding (actual) events from events scheduled to occur during a future duration. A progress profile of process 1 (in percentages) is indicated at the vertical axis at the left side of FIG. 9, and a measure of cumulative progress toward completion is indicated at the vertical axis at the right side of FIG. 9. Line 920 indicates a measure of cumulative progress so as to account for incremental (e.g., weekly) progress toward completion of process 1.

In the embodiment of FIG. 9, events occurring at weeks 4, 5, and 6 may be constrained to correspond to a completion rate of 4% per week. Additionally, events occurring at weeks 7, 8, and 9 may be constrained to correspond to a completion rate of 3% per week. In particular embodiments, such constraints may be realized via linking, for example, a computer-implemented spreadsheet with a computer-implemented calendaring tool. In such a scenario, in view of constraints placed upon rates of completion at weeks 4-9, a computer-implemented progress model of a multi-event process may respread events beginning at week 10, so as to achieve a desired a cumulative completion of approximately 30% at week 12. In the embodiment of FIG. 9, in response to constraining completion rates at weeks 4-9, a computer-implemented progress model may respread events beginning at week 10 and decreasing (e.g., ramping down) at weeks 10, 11, and 12.

In addition, a computer-implemented progress model for a multi-event process utilizing a computerized spreadsheet may apply a CPI having values other than 1.0, as shown in Table 1 (above). Accordingly, as indicated in Table 2 (below), a CPI of 0.75 may be applied to reduce expected actual progress to accord with a CPI of below 1.0, so as to account for, for example, an anticipated adverse weather impact, holiday, or other occurrence that operates to reduce a weekly progress rate of a particular process event. Thus, as shown in Table 2 (below) similar to a CPI at weeks 4, 5, and 6 shown in Table 1 (without expected weather delays), for example, a contractor may schedule progress in accordance with a CPI of 1.0. However, in anticipation of a scheduled local holiday, a progress profile of weekly events occurring at weeks 7, 8, and 9 a CPI may be reduced from 1.0 to, for example, 0.75. Thus, as indicated in Table 2 below, and in FIG. 9, a progress profile of events occurring at weeks 7, 8, and 9 is indicated as being reduced to 3%.

TABLE 2

| CPI Adjustment | Week 4 | Week 5 | Week 6 | Week 7 | Week 8 | Week 9 |
|---|---|---|---|---|---|---|
| 1.0 | 4.0% | 4.0% | 4.0% | | | |
| 0.75 | | | | 3.0% | 3.0% | 3.0% |

In addition, FIG. 9 indicates that responsive to a reduction in a CPI from 1.0 to 0.75, a weekly progress rate of an event occurring at week 10 may be indicated as increasing, as shown by arrow 930. A progress rate of the event may then ramp down, such as indicated with respect to weeks 11 and 12. It may be appreciated that responsive to a reduced CPI at weeks 7-9, a period of performance may be extended into weeks 11 and 12 (and perhaps beyond).

Figure 10:
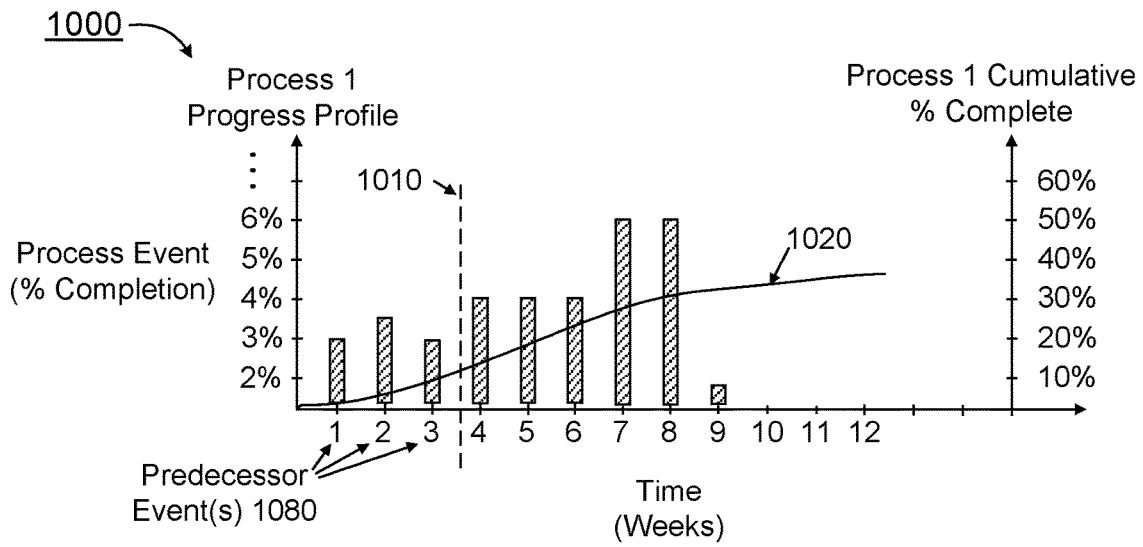
FIG. 10 depicts a visual representation of respreading of process events in response to linking of a computer-implemented model for a multi-event process with a computer-implemented calendaring tool, according to an embodiment.

In a particular further embodiment (1000), FIG. 10 depicts a visual representation of respreading of process events in response to linking of a computer-implemented progress model for a multi-event process with a computer-implemented calendaring tool. In the embodiment of FIG. 10, predecessor events 1080 of a multi-event process are indicated as being prior to dotted line 1010, which separates preceding (actual) events from events scheduled to occur during a future duration. A progress profile of process 1 (in percentages) is indicated at the vertical axis at the left side of FIG. 10, and a measure of cumulative progress toward completion is indicated at the vertical axis at the right side of FIG. 10. Line 1020 indicates a measure of cumulative progress so as to account for incremental (e.g., weekly) progress toward completion of process 1.

In the embodiment of FIG. 10, events occurring at weeks 4, 5, and 6 may be constrained to correspond to a completion rate of 4% per week. Additionally, events occurring at weeks 7 and 8 may be constrained to correspond to a completion rate of 6% per week. In particular embodiments, such constraints may be realized by linking, for example, a computer-implemented spreadsheet with a computer-implemented calendaring tool. In such a scenario, in view of constraints placed upon rates of completion at weeks 4-7, a computer-implemented progress model of a multi-event process may respread events beginning at week 10, so as to achieve a desired a cumulative completion of approximately 30% at week 12. In the embodiment of FIG. 10, in response to constraining completion rates at weeks 4-8, a computer-implemented progress model may respread events, such as to indicate that only a small amount of progress need to be made at week 9 to achieve a 30% at week 10.

In addition, a computer-implemented progress model for a multi-event process utilizing a computerized spreadsheet may employ a CPI having values other than 1.0. Accordingly, as indicated in Table 3 (below), a CPI of 1.2 may be applied to increase expected actual progress to a value greater than 1.0, so as to account for, for example, an effect of bringing on an additional shift, such as a swing shift or a night shift, so as to increase weekly progress of events of a particular process event. As shown in Table 3, similar to a CPI at weeks 4, 5, and 6 shown in Table 1, a contractor may schedule progress in accordance with a CPI of 1.0. However, to account for effects of adding a night shift or swing shift to complete events of a multi-event process, a progress profile of weekly events occurring at weeks 7 and 8, a CPI may be increased from 1.0 to, for example, 1.2. As indicated in FIG. 10, a progress profile of a respread event occurring at week 9 is indicated as being reduced to less than 2%.

TABLE 3

| CPI Adjustment | Week 4 | Week 5 | Week 6 | Week 7 | Week 8 |
|---|---|---|---|---|---|
| 1.0 | 4.0% | 4.0% | 4.0% | | |
| 1.2 | | | | 6.0% | 6.0% |

Figure 11A:
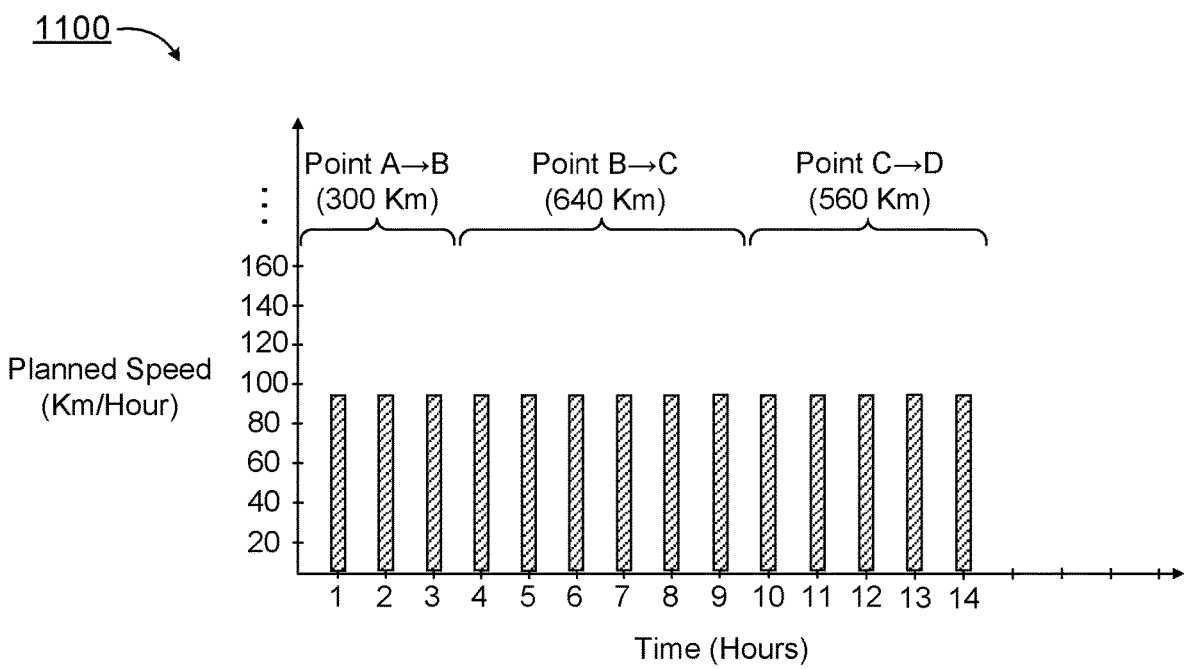
FIG. 11A depicts a visual representation of planned hourly events related to a process of driving from a point "A" to a point "C," wherein points "A" and points "C" relate to locations on a map, according to an embodiment.

FIG. 11A depicts a visual representation of planned hourly events related to a process of driving from a point "A" to a point "C," wherein points "A" and points "C" relate to locations on a map, according to an embodiment 1100. In one possible embodiment, point "A" may represent a first city (e.g., Austin, Texas), point "B" may represent a second city (e.g., Houston, Texas), and point "C" may represent a third city (e.g., New Orleans, Louisiana). The visual representations identified in FIG. 11A may be made possible via a user interacting with a computing platform or other computing entity such as described in relation to FIG. 5 and/or FIG. 6. In accordance with the embodiment of FIG. 11A, a driver may arrive at an initial plan, which may comprise a schedule having planned durations for progress to be made at hourly intervals so as to drive an automobile from point "A" to point "C." The planned durations depicted in FIG. 11A indicates kilometers driven during particular intervals (e.g., hours) so as to arrive at point "C" at hour 14. Thus, in accordance with an initial plan, a driver is to cover approximately 96 kilometers in each of 14 hours. It should be noted that in particular embodiments, a scheduled plan that does not include a progress plan for kilometers covered per hour, may merely comprise a roadmap that does not account for actual progress made toward arrival at point "C." Thus in particular embodiments, a time-phased structure of a computer-implemented progress model further expands a roadmap to form a progress assurance model. A progress assurance model may thus be utilized to generate required progress, as a function of hours driven, to proceed from point "A" to point "C."

It should be noted that typical scheduling tools do not include an approach to indicate, for example, a speed of travel along a map, which may be problematic, and may be addressed by at least particular embodiments of claimed subject matter. In the embodiment of FIG. 11A, a computer-implemented progress modeling tool has been linked to a map and schedule with kilometers covered per unit time (e.g., hours). It should also be noted that without accounting for the progress of process events, which may comprise, for example, kilometers driven per hour (or, for example, units of concrete poured per unit time), a driver or contractor may be permitted to merely modify (e.g., add or extend) the duration over which process events occur without a contracting officer, customer, or other type of overseer being apprised of a revised completion date of a particular process. Thus, it may be appreciated that without forming a link between a map and a schedule with process events (e.g., kilometers covered per hour, units of concrete poured per week, etc.) a new completion date may not become apparent to an overseer.

In the embodiment of FIG. 11A, responsive to a driver leaving point "A" an event reporting period begins. Thus, a computer-implemented progress model operates to report progress after discrete process events (e.g., hourly progress events). In addition, the computer-implemented progress model accounts for the remaining process events (e.g., kilometers remaining to arrive at point "C") that are to be completed and operates to respread process events, such as kilometers to be covered during future hours. Thus, in a broader sense, returning briefly to events relative to achieving weekly progress of events related to pouring concrete at a construction site, at the close of a given week, progress of the given week may be considered and the remaining units of concrete to be poured are revised so as to respread events over the remaining duration allotted to complete all concrete-pouring events of the process. Such respreading of process events may occur dynamically and rapidly so as to periodically (e.g., hourly, daily, weekly, etc.) provide an updated progress profile toward completion of a process of a multi-event process. Further, responsive to predecessor events occurring at progress rates less than those planned, an unplanned and undesirable bow wave of progress, which may occur without appropriate visibility by an overseer into remaining events of a process, may be avoided.

Figure 11B:
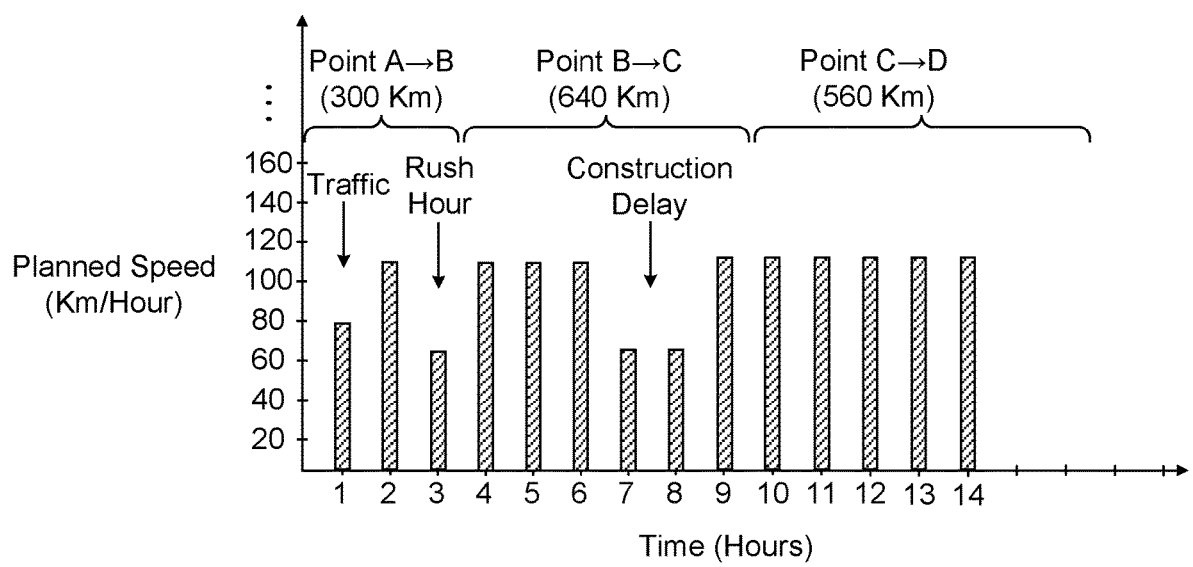
FIG. 11B depicts a revised visual representation of planned hourly events responsive to a speculation based, at least in part, on an alternative driving scenario, according to embodiment.

FIG. 11B depicts a revised visual representation of planned hourly events responsive to a speculation based, at least in part, on an alternative driving scenario, according to embodiment 1101. In the embodiment of FIG. 1B, a driver may consider, for example, various scenarios, such as driving through city traffic populated with stoplights, which may impede driving progress toward point "C." A driver may additionally consider a scenario in which rush-hour traffic and/or construction delays may also impede driving progress. Accordingly, as shown in FIG. 11B, such progress impediments may be visually represented so as to indicate that a driver may need to proceed at a speed of approximately 110 kilometers per hour, so as to arrive at point "C" at hour 14.

Figure 11C:
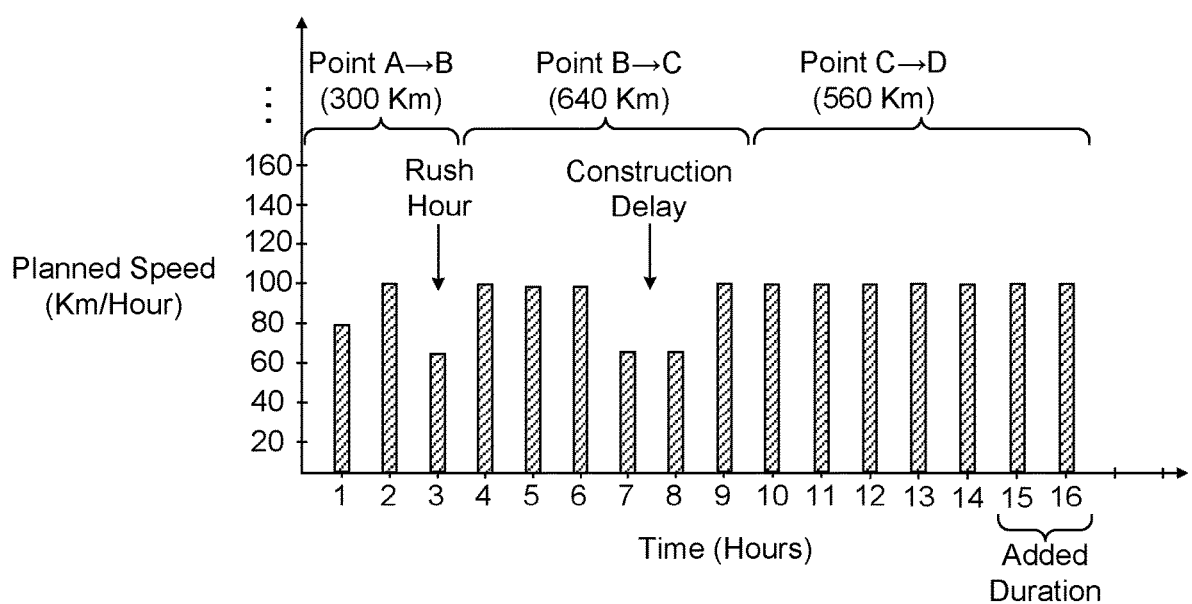
FIG. 11C depicts a visual representation of respread hourly events related to a process of driving from point "A" to point "C" responsive to another alternative driving scenario, according to embodiment.

FIG. 11C depicts a visual representation of respread hourly events related to a process of driving from point "A" to point "C" responsive to another alternative driving scenario, according to embodiment 1102. The embodiment of FIG. 11C may arise from consideration of speed and/or other limitations, such as recognition of the maximum safe driving speed limit. In such a scenario, an embodiment of a computer-implemented progress model may operate to increase a duration allotted for a process (e.g., driving from point "A" to point "C"). Thus, as shown in FIG. 11C, hours 15 and 16 are added, so as to extend a driving time beyond hour 14. In particular embodiments, computing platform 550 of FIG. 5C, which may employ rules-based logic (556) coupled to time-phased process events (558), may operate to rapidly bring about the visual representation of FIG. 11C showing a consequence of recognition of a maximum safe driving speed limit. It may be appreciated that typical scheduling tools may be incapable of generating such visual representations. It may also be appreciated that computing platform 550 may facilitate interactive generation such visual representations in a matter of seconds—even for multi-event construction-related processes comprising hundreds or thousands of events.

Figure 11D:
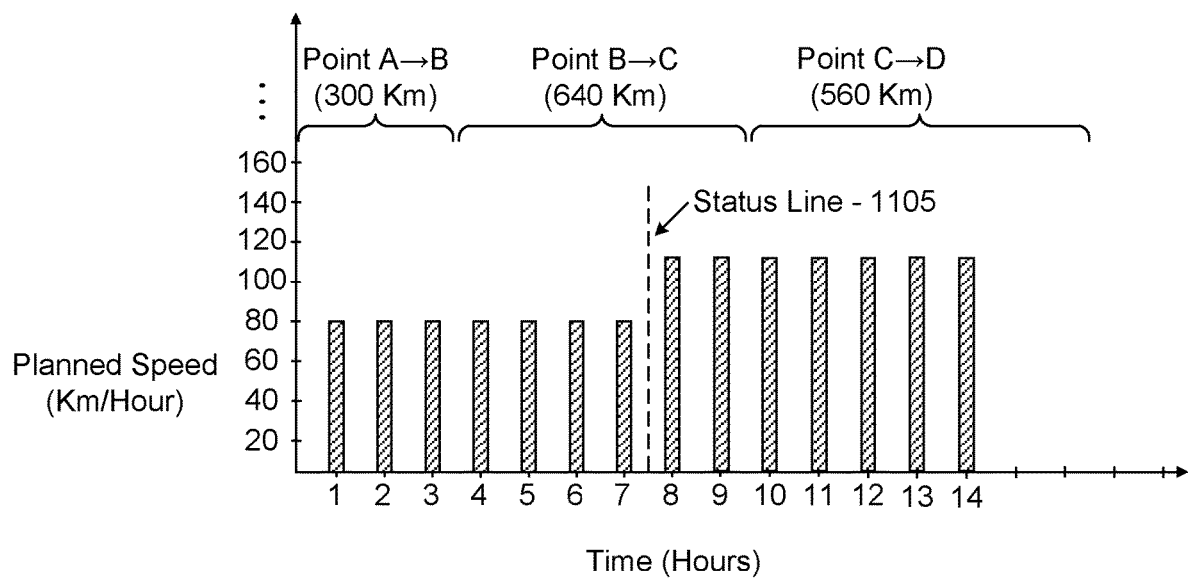
FIG. 11D depicts a visual representation of planned hourly events related to a process of driving from a point "A" to a point "C," wherein points "A" and points "C" relate to locations on a map, according to an embodiment.

FIG. 11D depicts a visual representation of planned hourly events related to a process of driving from a point "A" to a point "C," wherein points "A" and points "C" relate to locations on a map, according to an embodiment 1103. In FIG. 11D, planned progress impediments, such as city traffic delays, rush-hour delays, construction delays, and maximum safe speed limits, as indicated in FIG. 11A and FIG. 11B, are not considered. As shown in FIG. 11D, status line 1105 indicates an approximate halfway point of a process of driving from point "A" to a point "C." Accordingly, in response to a driver covering approximately 550 kilometers toward point "C," the driver may still be required to cover the remaining distance to point "C" in an allotted 7 hours. Accordingly, as indicated, to arrive at point "C," the driver is to average approximately 112 kilometers per hour over the remaining 7 hour duration. In a construction-related embodiment, for example, a contractor may have poured only 100 cubic meters of concrete per week preceding multi-week duration, which may be in contrast to an originally planned pouring of 125 cubic meters of concrete per week over the duration.

It may be appreciated that typical computer-implemented scheduling tools may permit a contractor to withhold scheduling and progress parameters from an overseer. In some instances, an unscrupulous contractor may claim that progress can be easily accelerated at future dates (e.g., by hiring additional personnel, securing additional equipment, etc.) or that an original schedule may have already considered delays in progress. Such claims may be difficult for an overseer to verify or to call into question in view of limitations of typical computer-implemented scheduling tools. In contrast, particular embodiments of claimed subject matter may operate to provide an overseer with a tool that facilitates such refuting of contractor claims or, on the other hand, verification of contractor claims.

Returning to FIG. 11D, a computer-implemented progress model may report that a driver's average speed over a predecessor 7-hour duration has been 80 kilometers per hour, rather than the originally planned 96 kilometers per hour. In addition, the progress model may provide a visual representation to indicate that the driver is to average approximately 112 kilometers per hour to arrive at point "C" at hour 14. Accordingly, a driver may generate a revised schedule to represent that, for example, to arrive at point "C" the driver will travel at a rate of speed of approximately 112 kilometers per hour over the future duration of 7 hours.

Figure 11E:
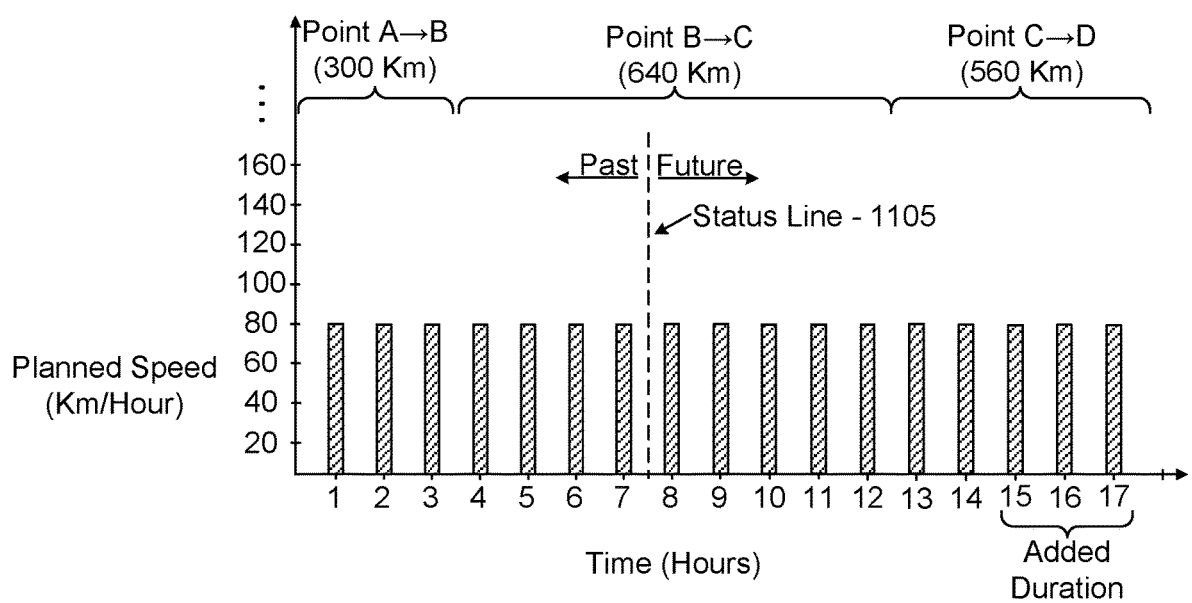
FIG. 11E depicts a visual representation showing speculated hourly events related to driving from point "A" to point "C" in view of predecessor events being below originally planned progress, according to an embodiment.

FIG. 11E depicts a visual representation showing speculated hourly events related to driving from point "A" to point "C" in view of predecessor events being below originally planned progress, according to an embodiment 1104. In the embodiment of FIG. 11E, predecessor events indicate that the driver has progressed toward point "C" for a preceding 7-hour duration at a rate of speed of 80 kilometers per hour. As indicated, responsive to the driver progressing at a rate of speed of 80 kilometers per hour, a computer-implemented progress model indicates that the driver is now scheduled to arrive at point "C" at hour 17, rather than at hour 14, as originally planned. It may be appreciated that FIG. 11E indicates a normalization of respread future events based on actual predecessor events, such as the driver's speed over the previous 7-hour period.

Figure 11F:
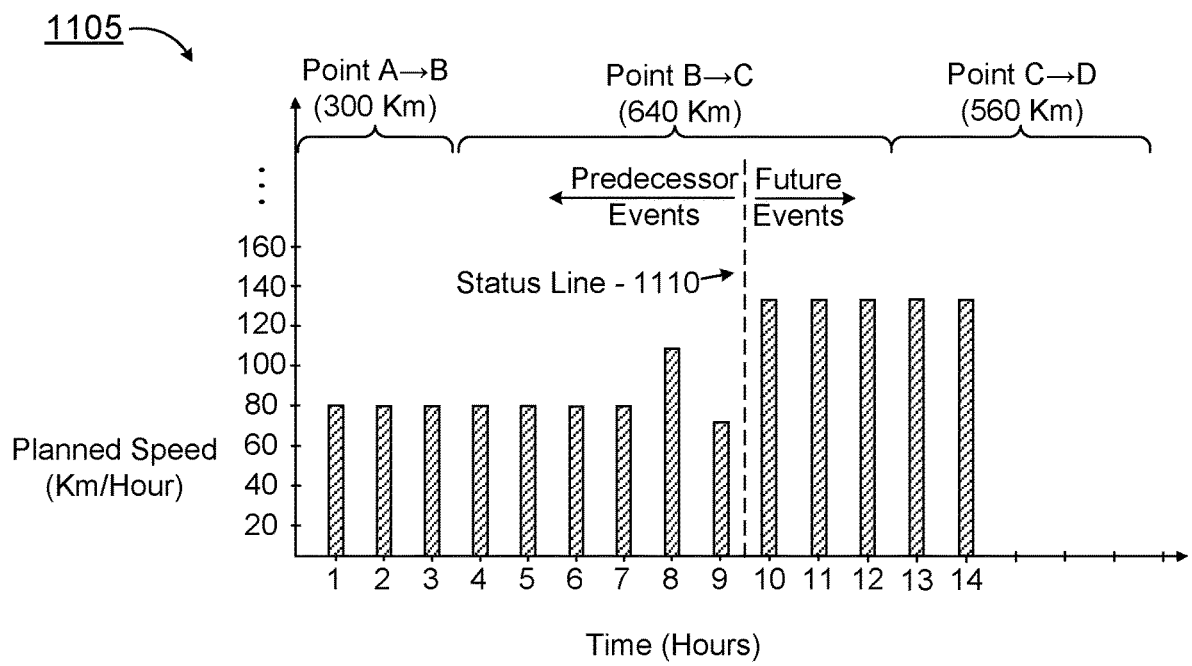
FIG. 11F depicts a visual representation showing actual predecessor and speculated future events related to driving from point "A" to point "C" in view of predecessor events being below originally planned progress, according to an embodiment 1104.

FIG. 11F depicts a visual representation showing actual predecessor and speculated future events related to driving from point "A" to point "C" in view of predecessor events being below originally planned progress, according to an embodiment 1104. As shown in FIG. 11F, after averaging 80 kilometers per hour during hours 1-7, the driver has covered approximately 104 kilometers during hour 8 and approximately 65 kilometers at hour 9. Status line 1110 indicates the driver's progress at the end of hour 9, Accordingly, a computer-implemented progress model may indicate that the driver is to cover the remaining distance during hours 10-14. As indicated, to cover such a distance, the driver may be scheduled to increase the rate of speed to approximately 148 kilometers per hour, which may be infeasible. As previously indicated, such an unreasonable increase in driver speed may represent a problematic bow wave event, in which a driver may claim that such a driving speed during hours 10-14 can be achieved, and that an overseer need not be concerned that progress toward point "C" at hour 14 is still fully attainable. It may be appreciated that particular embodiments of claimed subject matter may operate to provide an overseer with detailed insight which may operate to refute or call into question such claims. In such instances, a contracting officer, customer, or other type of overseer may, instead, present a visual representation indicating more reasonable progress, such as that shown in FIG. 11E, which indicates that the driver is more likely to arrive at point "C" at hour 17, or an even later time, which may be more realistic than an assumption that a driver can maintain a speed of 132 kilometers per hour over hours 10-14.

In the context of hardware entities of FIGS. 5 and 6 of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of actual values of predecessor events, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more actual values of predecessor events.

The terms "correspond," "reference," "associate," and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory (e.g., memory 554 of FIG. 5), such as for processing by a processor and/or similar device, for example. Thus, in a particular context, "associating," "referencing," and/or "corresponding" may, for example, refer to an executable process of accessing contents of memory 554 of two or more memory locations, for example, to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network, such as devices of network 530 of FIG. 5, may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device, such as with respect to devices of network 530 of FIG. 5, refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms "client," "client device," "client computing device," "client computing platform," and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a device of network 530 may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

The terms "computer-implemented spreadsheet" and "computer-implemented calendar" or variations of these terms are utilized in this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

As suggested previously, communications between a computing device and/or a network device (e.g., a device of network 530) and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing platform and/or device of network 530 may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing platform and/or device of network 530 may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing platform and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing platform and/or network device may also include executable computer instructions to perform a variety of possible tasks, such as browsing, searching, playing various forms of digital content, including locally stored and/or streamed video, and/or games. The foregoing is provided merely to illustrate that claimed subject matter is intended to include a wide range of possible features and/or capabilities.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computing platform and/or a similar special purpose computing platform and/or network device (e.g., a device of network 530). In the context of this specification, therefore, a special purpose computing platform and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computing platform and/or similar special purpose computing and/or network device. In the context of this particular patent application, as mentioned, the term "specific apparatus" therefore includes a general purpose computing platform and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A computer-implemented method of modeling a multi-event process, the method comprising:
   loading into one or more computer memory devices, a digitized representation of a plurality of events of the multi-event process, a first one or more of the plurality of events being linked to a previous first one or more, or to a previous second one or more, of the plurality of events;
   generating, via a display device coupled to one or more computer processors in communication with the one or more computer memory devices, a first visual representation comprising one or more visual indicators to represent progress of the first one or more of the plurality of events;
   modifying one or more attributes of the first one or more of the plurality of events or of the second one or more of the plurality of events;
   computing a progress profile of the first one or more events based, at least in part, on the one or more modified attributes of the previous first one or more, or of the previous second one or more, of the plurality of events, wherein computing the progress profile of the first one or more events comprises respreading the first one or more events over a future duration, wherein respreading the progress profile of first one or more events comprises respreading an increasing or a decreasing rate of progress over the future duration; and
   generating, via the display device, a second visual representation representing the progress profile of the first one or more events based, at least in part, on the one or more modified attributes of the previous first one or more, or of the previous second one or more, of the plurality of events.

2. The computer-implemented method of claim 1, wherein the one or more modified attributes of the previous first one or more of the plurality of events, or of the previous second one or more, of the plurality of events, corresponds to a progress profile of the previous first one or more events or of the previous second one or more events accumulated over a duration.

3. The computer-implemented method of claim 1, wherein the one or more modified attributes of the first one or more events correspond to a performance factor of the first one or more events during a past duration.

4. The computer-implemented method of claim 1, further comprising:
selecting, via a user interface, one of a plurality of selectable time periods to represent progress of the first one or more events over a future duration.

5. The computer-implemented method of claim 1, wherein the one or more modified attributes of the previous first one or more events, or of the previous second one or more events, corresponds to a start date of the first one or more events or of the second one or more events.

6. The computer-implemented method of claim 1, wherein the one or more modified attributes of the previous second one or more events corresponds to an end date of the previous second one or more events.

7. The computer-implemented method of claim 1, wherein at least one of the first one or more events is linked to the second one or more events such that at least one of the first one or more events does not initiate until completion of at least a percentage of the at least one of the second one or more events.

8. The computer-implemented method of claim 1, wherein the first or the second visual representations correspond to visual indicators of a bar graph.

9. An apparatus coupled to a display device to model a multi-event process, the apparatus comprising at least one processor coupled to one or more computer memory devices to:
load into one or more computer memory devices, a digitized representation of a plurality of events of the multi-event process, a first one or more of the plurality of events to be linked to a previous first one or more, or to a previous second one or more, of the plurality of events;
generate, via the display device coupled to the at least one computer processor coupled to the one or more computer memory devices, a first visual representation comprising one or more visual indicators to represent progress of the first one or more of the plurality of events;
modify one or more attributes of the previous first one or more of the plurality of events or, of the previous second one or more, of the plurality of events;
compute a progress profile of the first one or more events based, at least in part, on the one or more modified attributes of the previous first one or more, or of the previous second one or more, of the plurality of events, wherein computing the progress profile of the first one or more events comprises respreading the first one or more events over a future duration, wherein respreading the progress profile of first one or more events comprises respreading an increasing or a decreasing rate of progress over the future duration; and
generate, via the display device, a second visual representation to represent a progress profile of the first one or more events based, at least in part, on the one or more modified attributes of the previous first one or more, or of the previous second one or more, of the plurality of events.

10. The apparatus of claim 9, wherein the one or more modified attributes of the previous first one or more of the plurality of events, or of the previous second one or more of the plurality events, is to correspond to a progress profile of the previous first one or more events or of the previous second one or more events accumulated over a past duration.

11. The apparatus of claim 9, wherein the one or more modified attributes of the first one or more events is to correspond to a performance factor of the first one or more events in a future duration.

12. The apparatus of claim 9, wherein the at least one processor coupled to the one or more computer memory devices are further to:
select, responsive to one or more input signals from a user interface, one of a plurality of selectable time periods to represent progress of the first one or more events within a predetermined duration.

13. The apparatus of claim 9, wherein the one or more modified attributes of the previous first one or more events, or of the previous second one or more events, corresponds to a start date of the previous first one or more events or of the previous second one or more events.

14. The apparatus of claim 9, wherein the one or more modified attributes of the previous second one or more events corresponds to an end date of the previous second one or more events.

15. An article comprising:
one or more non-transitory computer-readable media having instructions encoded thereon which, when executed by one or more computer processors coupled to one or more computer memory devices, are operable to:
load into one or more computer memory devices, a digitized representation of a plurality of events of a multi-event process, a first one or more of the plurality of events are to be linked to a previous first one or more, or to a previous second one or more, of the plurality of events;
generate, via a display device coupled to the one or more computer processor coupled to the one or more computer memory devices, a first visual representation comprising one or more visual indicators to represent progress of the first one or more of the plurality of events;
modify one or more attributes of the previous first one or more of the plurality of events or of the previous second one or more, of the plurality of events;
compute a progress profile of the first one or more events based, at least in part, on the one or more modified attributes of the previous first one or more, or of the previous second one or more, of the plurality of events wherein computing the progress profile of the first one or more events comprises respreading the first one or more events over a future duration, wherein respreading the progress profile of first one or more events comprises respreading an increasing or a decreasing rate of progress over the future duration; and
generate, via the display device, a second visual representation to represent the progress profile of the first one or more events based, at least in part, on the one or more modified attributes of the previous first one or more, or of the previous second one or more, of the plurality of events.

16. The article of claim 15, wherein at least one of the first one or more events is to be linked to the second one or more events such that at least one of the first one or more events does not initiate until completion of at least a percentage of the at least one of the second one or more events.

* * * * *